April 22, 1969   C. J. BREUKINK ET AL   3,440,309
PRODUCTION OF EXPANDED THERMOPLASTIC PRODUCTS
Filed March 26, 1965
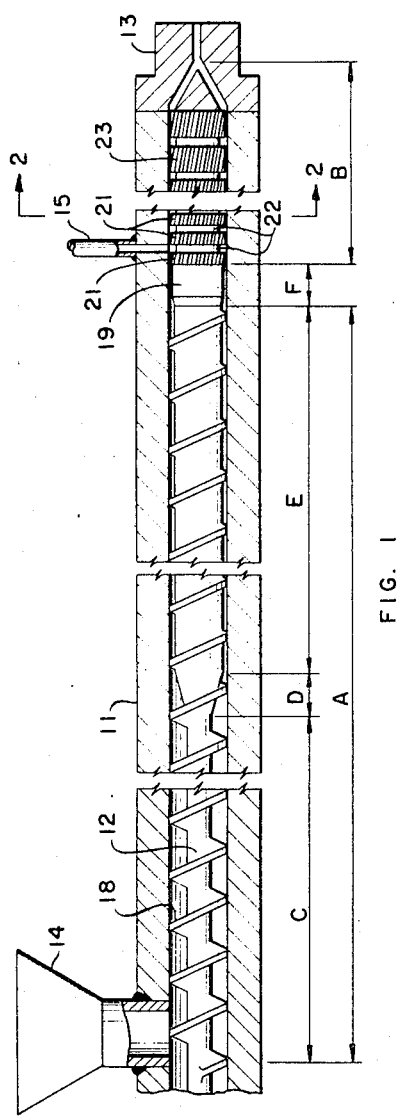
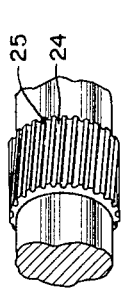
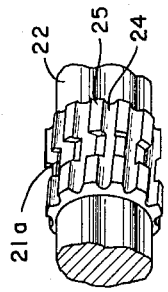
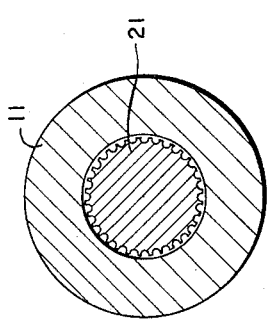
INVENTORS:
CAREL J. BREUKINK
JACOB VERMEULEN
BY: *Martin S. Baer*
THEIR ATTORNEY 3,440,309
PRODUCTION OF EXPANDED THERMOPLASTIC PRODUCTS
Carel J. Breukink and Jacob Vermeulen, Delft, Netherlands, assignors to Shell Oil Company, New York, N.Y., a corporation of Delaware
Filed Mar. 26, 1965, Ser. No. 442,881
Claims priority, application Netherlands, Mar. 31, 1964, 6403440
Int. Cl. B29d 27/00; D01f 7/02; B29h 3/08
U.S. Cl. 264—53       8 Claims

ABSTRACT OF THE DISCLOSURE

An improved method for producing fine, uniform foams of polyolefins or polyvinyl chloride (PVC) by extrusion comprises the use, as blowing agent, of a volatilizable liquid such as a $C_4$–$C_5$-paraffin for polyolefin or an acetone-pentane mixture for PVC, together with a small amount of a decomposable organic blowing agent which is selected to decompose in the extruder at a temperature within 60° C. of the maximum temperature of the plastic mass in the extruder. The conditions in the extruder are selected to provide a decreasing pressure profile from the point of injection of the volatilizable blowing agent.

---

This invention relates to the production of cellular thermoplastic articles by extrusion.

The invention is particularly adapted for the production of linear polypropylene products and will be described mainly in connection therewith. It may also be applied, however, in the production of cellular extruded products for thermoplastic polymers similar to polypropylene in their properties, e.g., polyethylene and polyvinylchloride.

Methods are now well known to persons skilled in this art for producing cellular polystyrene articles by blending a volatile liquid blowing agent with polystyrene in an extruder and extruding the mixture into the atmosphere. It is known that more uniformly fine-celled polystyrene foams can be produced when the mixture contains a foam-nucleating system, such as combinations of an acid and a carbon-dioxide-liberating compound. Use of finely divided inert solid materials, such as silica, calcium silicate, or zinc stearate, as foam nucleating agents has also been suggested.

Various methods for producing expanded polyolefin articles have also been disclosed in the patent literature. In studies directed to methods suitable for the production of cellular polypropylene articles on a commercial scale we have found that special problems are presented by linear polyolefins, and particularly by isotactic polypropylene. Unlike other thermoplastic materials heretofore used, particularly polystyrene, isotactic polypropylene is characterized by a sharp melting point and a great change in viscosity near the melting point. It is therefore very sensitive to the conditions at which it is held within the extruder and at which it is extruded. Uniform distribution of blowing agent in the polypropylene is difficult of achievement. The conditions taught in published literature and patents for production of cellular polystyrene and polyolefins are not appropriate for commercial production of polypropylene foam articles of uniformly fine cellular structure.

We have found that the methods in which use is made of the finely divided solid substances in order to control the cell size of the foam, are in practice not satisfactory. A foam with a low density and homogeneous, small cell size may, in a continuous process while using the said substances, only be obtained when the volatile foaming agent is employed in large concentrations. The action of the said compounds is also unsatisfactory inasmuch as a foam with an acceptably low density obtained in this way has a surface which is not very attractive. At its surface the foam then shows a non-closed cell structure, large burst blisters appearing at various places.

We have also found that it is very difficult, if not impossible to continuously manufacture foamed polyolefin products having a constant foam quality when using an extruder in which the pressure of the mass is increased between the point at which the volatile foaming agent is injected and the die. In this case the quantity of volatile foaming agent in the mixture varies with the time so that the density of the foam and its cell size and cell size distribution, considered over longer production periods, do not remain constant.

This invention comprises a process for the manufacture of a shaped foam from a thermoplastic linear polyolefin or polymer having similar physical properties by extrusion of a mixture comprising the polymer and a volatile organic foaming agent injected directly into the extruder which mixture, on leaving the die, expands to a foam. The process of this invention is characterized in that a thermally decomposing organic blowing agent is at the same time taken up in the mixture, which blowing agent decomposes therein at a temperature which is not more than 60° C. lower than the maximum mass temperature prevailing in the extruder, and that the mass is intensively homogenized in a mixing zone of the extruder after the volatile foaming agent has been injected into the said zone, while being conveyed in the direction of the die, while the pressure of the mass during the said conveyance remains constant or decreases.

The polymer which is used as starting material in the present process, may be either a homopolymer or a copolymer. The expression "thermoplastic polymer" comprises in this specification only those materials which are not or at least not predominantly rubber-like by nature. The invention is particularly adapted for use with linear polymers of alpha-monoolefins, such as polypropylene, and high density polyethylene. It may also be employed with polymers of a vinyl halogen monomer, such as vinyl chloride. The polymers may, if desired, contain as intimate blends a small quantity, e.g., 1–15 percent, of rubber-like material such as is conventionally added to provide high impact resistance. In such blends the rubber properties in the starting material do not predominate.

In the process according to the invention the thermoplastic polymer may be employed in any desired form, for example in the form of granules, nibs, pellets, powders or beads.

As inert volatile organic foaming or blowing agents compounds having atmospheric boiling points not exceeding 120° C. may suitably be used. Many of these compounds are well known and commercially available. In general, suitable foaming agents are those volatile liquids, boiling in the defined range, which are non-reactive with the liquefied polymer. Illustrative of suitable types of compounds are those disclosed in U.S. Patents 2,816,827 and 2,848,428. Good foaming agents are volatile halohydrocarbons such as the chloromethanes, for example chloroform, the chlorofluoroethanes, propanes or butanes, such as dichlorodifluoroethane, monochlorotrifluoroethane, dichloropentafluoropropane, monochloroheptafluorocyclobutane and the like. Other suitable foaming agents are low-boiling ethers, alcohols or ketones such as diethyl ether, methanol or acetone. The aliphatic hydrocarbons having a boiling range of from 10 to 100° C. in particular, expecially pentane, have proved to be very suitable in the process according to the invention. In general, it is necessary to choose the volatile foaming agent in such a way that it can be added in liquid form to the mass to be extruded at the conditions of pressure and temperature prevailing in the extruder during the injection. If desired, mixtures of volatile foaming agents may be employed; thus, in the preparation of a polyvinyl chloride foam, a mixture of pentane and acetone may suitably be used as volatile foaming agent.

Generally, an inert volatile liquid foaming agent such as one of the above is added to the plastic mass in the extruder in an amount in the range from about 2 to 20% by weight, based on polymer. The preferred range is from 5 to 10% by weight. Controlled variation of the concentration of volatile foaming agent, other conditions being held essentially constant, results in controlled change in density of the expanded polymer product.

In this specification "thermally decomposing organic blowing agents" are understood to mean organic compounds which decompose with the evolution of gas at an elevated temperature in the range in which the thermoplastic polymers are plasticized in the extruder. The decomposition of these thermally decomposing organic blowing agents is not initiated by chemical reaction with other compounds, such as acids or bases. A factor to be taken into account in the choice of suitable compounds is that the temperature at which the compound decomposes in the mixture within an extruder is not the same as the temperature at which the substance decomposes in the air at atmospheric pressure. This latter temperature is in general higher than the decomposition temperature occurring in the mixture in an extruder. Thus, for example, the blowing agent benzene-m-disulfohydrazide decomposes in the air at 146° C., whereas the decomposition temperature in the mixture in an extruder may vary from 115° to 130° C., depending on the prevailing conditions. In the process according to the invention only those compounds are used which decompose in the mixture in the extruder at a temperature which is not more than 60° C., and preferably not more than 40° C., lower than the maximum mass temperature prevailing in the extruder. By mass temperature is meant the temperature of the molten or plasticized polymer in the extruder. This temperature may readily be determined, for example, by measuring it with thermoelements. If the relation between the temperature of the polymer in the extruder and the temperature of the extruder barrel is known, measurement of the temperature of the barrel will suffice for determing the maximum mass temperature. This relation may be found in a simple manner in a few routine experiments by measuring the temperature of the mass and that of the barrel. In general, it may be stated that in the extrusion according to the invention the maximum mass temperature will as a rule be approximately 10° to 15° C. higher than the highest barrel temperature.

Preferably nitrogen-liberating blowing agents are used. For the preparation according to the invention of foams from polypropylene, azodicarbonamide in particular has proved to be suitable. 4,4'-oxybis(benzenesulfohydrazide) and diphenylsulfone-3,3'-disulfohydrazide may be mentioned as useful compounds for polyethylene and polyvinyl chloride. Other suitable compounds are N,N'-dinitrosopentamethylenetetramine, diazoamino benzene, benzene sulfohydrazide, benzene-m-disulfohydrazide, N,-N' - dimethyl - N,N' - dinitrosoterephthalamide, N,-N'-dimethyl-N,N'-dinitrosophthalamide, azodiisobutyronitrile and N,N'-ethylenedibenzamide.

The function of the thermally decomposing blowing agent as it is used in the present process is two-fold. The first and by far the most important function is the control of the cell size and the cell size distribution of the foam to be manufactured inasmuch as a very small cell size and a homogeneous cell size distribution in the product can be realized. In this case, the thermally decomposing blowing agent behaves as a so-called foam nucleating agent. The second function, which is only of minor importance, comprises the conventional behavior as blowing agent, so that the gases liberated in the thermal decomposition contribute to the expansion of the mixture issuing from the die. In order to obtain a foam with a homogeneous structure of small cells, it is essential that the blowing agent does, in fact, thermally decompose in the mixture, so that it is necessary that the decomposition temperature to be chosen is lower than the maximum mass temperature. In general, however, this expansion will for the most part be effected by evaporation of the volatile foaming agent, so that normally the gas-developing compounds are used in smaller concentrations than the volatile foaming agent. Preferably, the mixture in the extruder only contains small concentrations, viz from 0.1 to 1% by weight, of the thermally decomposing blowing agent. Concentrations as low as 0.01 and as high as 5% by weight may be used in some cases, if desired.

The thermally decomposable blowing agent is preferably introduced into the extruder through the hopper, together or mixed with the polymer. If desired, it may be injected into the extruder together with the volatile foaming agent, for example in the form of a solution or a suspension.

The process according to the invention makes it possible, starting from polymers which contain no foaming agent, to manufacture foams in one single process run with direct injection of relatively small quantities of volatile foaming agent, the said foams having a particularly low density, as low as 1 pound per cubic foot, and a homogeneous distribution of very small cells, up to approximately 0.1 mm. in diameter. The foamed products manufactured according to the present process possess a predominantly closed cell structure not only on but also under the surface. It has been found that the nucleating action of the thermally decomposing, organic blowing agents employed is sufficient so that the use of non-decomposing, finely divided, inorganic, solid substances, such as calcium stearate, silica, calcium oxide or zinc stearate, is not necessary. This latter procedure is, inter alia, advantageous when the present process is carried out with an extruder which is provided with a screen or screen pack at the entrance of the die. Such screens are often used for retaining polymer particles which have not melted or which are insufficiently plasticized. Because the said solid substances need not be present in the mixture to be extruded there is less chance of clogging in the screen pack during extrusion.

In the process of the invention it is essential that the pressure of the mass in the extruder, after the volatile foaming agent has been added thereto, is not increased during the conveyance in the direction of the die. For this reason the extruder to be used must not, in the mixing zone, comprise any compression zone or any other zone which may exert a pressure-increasing action, and the pressure of the mass, even before it enters the mixing zone, should be raised to a pressure which is at least equal to the pressure at the entrance of the die. By a compression zone is usually understood a zone in an extruder in which the channel depth of the screw decreases abruptly or gradually and the speed of the screw remains constant. An example of another zone which may exert a pressure-increasing action is a zone in which the channel depth of the screw remains constant and the pitch of the screw decreases. Moreover, in some cases, a so-called metering zone, characterized by a constant channel depth and a constant pitch of the screw, may exert a pressure-increasing action.

An important advantage of the process according to the invention is that it permits the continuous manufacture of products with a constant foam quality. Moreover, the present process may successfully be carried out with the aid of extruders having an L/D ratio of less than 35. L is in this case the length of the extruder, calculated from the hopper to the beginning of the die, and D is the inner diameter of the extruder barrel. This advantage is important since the L/D ratio of commercially available extruders is restricted to approximately 35. It is very expensive to work with an extruder having an L/D ratio of 40 or 50, for with such exceptionally long extruders extremely great forces of torsion occur in the screw during extrusion. In order to counteract the objections of these great forces of torsion, special and often expensive provisions are necessary with such extruders. The process of this invention is particularly designed to permit successful operation in commercially available single screw extruders of L/D ratios between 20 and 35.

In the process it is not otherwise essential that the pressure of the mass during its conveyance throughout the mixing zone should remain constant or should decrease. It is possible that in the first part of the mixing zone the pressure of the mass decreases and in the last part the pressure remains constant or vise versa. In order to mix the volatile liquid foaming agent injected into the extruder, conventional means may be used; for example, the mass may be conveyed through a metering zone having a narrow flow passage, provided the pressure of the mass is not increased during the said conveyance. This gives rise to a mixing effect because the flow of mass is subjected to considerable shearing stresses, which are transversely directed relative to the longitudinal axis of the extruder; these shearing stresses are primarily caused by the resistances of the inner surface of the extruder barrel and of the outer surface of the spindle lying opposite the inner surface of the barrel. However, when the mixing zone is exclusively composed of a metering zone, the mixture is in general not sufficiently intensively homogenized, while moreover, owing to the narrow flow passage required, the productive capacity of the said metering zone is small. An intensive homogenization of the mixture may be obtained in a relatively short mixing zone by repeatedly subjecting the mass during its conveyance in the direction of the die, to successive considerable and less considerable tangential forces. In the process according to the invention the mass is preferably intensively homogenized by repeatedly subjecting it over at least the major part of the mixing zone to successive considerable and less considerable tangential forces. The alternate subjection to considerable and less considerable tangentially directed forces is preferably effected by passing the mass through a number of grooved mixing elements which are separated from each other by short, relatively narrow, annular flow zones, and which divide the annular stream of the mass into a number of separate streams. To this end, the mixing elements are designed as collars on the rotating spindle. The grooves of the said collars may suitably be screw-shaped with a pitch angle of approximately 30° relative to the central axis. As a result of the rotation of the extruder spindle with the mixing elements the mass, when it is passed in its separate streams through the grooves of the mixing elements is subjected to considerable tangential forces and, when it is passed through the annular flow zones, is subjected to less considerable tangential forces.

The process of the invention may very suitably be carried out in an extruder having a length of 20 to 30D. The ratio of the length of the mixing zone to the total length of the screw part of the extruder may vary. Preferably, a mixing zone is used of at least 7D and at most 15D in length. Moreover, the length of the annular flow zones separating the said mixing elements from each other, may have various values. Mixing elements having a length of from 0.1 to 0.8D, in particular having a length of 0.2D are, for example, very suitable. The said mixing elements are separated by annular flow zones having a length of from 0.05 to 0.3D, a length of 0.1D being preferred. It is also possible to use a mixing zone which is divided into a primary and secondary mixing zone. In this case the primary zone contains short mixing elements of the above-mentioned length, and in the secondary mixing zone longer mixing elements, for example with a length of from 1.0 to 1.5D, are present. However, short mixing elements are preferably used over the whole or substantially the whole length of the mixing zone. The first or sole supply opening for the injection of volatile foaming agent may issue between the first and second mixing elements or on the first mixing element.

A suitable embodiment of the process of the invention and of the extruder used in this process will be further illustrated with reference to the drawing, wherein:

FIG. 1 is a simplified representation of a longitudinal cross section of an extruder and die head suitable for use in the process;

FIG. 2 is a simplified cross section of the extruder along line X—X of FIG. 1, illustrating the section of a mixing element;

FIG. 3 is an isometric view of a mixing element of the extruder torpedo; and

FIG. 4 is an isometric view of a different mixing element of the extruder torpedo.

The extruder is represented schematically in the drawing in order to simplify description of the invention. Not shown are such well-known features as the design and location of heat exchange means; separation of the body of the extruder into segments and components; separation of the screw and torpedo into segments which are assembled into one unit by means of screw threads; arrangement of the screw bearing and prime mover; and the like. Such details of extruders are shown, for example, in Chapter 4 of "Processing of Thermoplastic Materials" by Bernhardt, Reinhold Publishing Corp., N.Y., 1959; in "Modern Plastics Encyclopedia, 1963," pages 744–46 and references cited there; and in many patents and publications.

The illustrated apparatus consists of extruder body 11, extruder screw 12, the front part of which is a mixing torpedo, extrusion die 13, feed hopper 14, and inlet line 15 for liquid foaming agent.

The extruder illustrated in FIG. 1 is divided into zone A, the feed, pumping and metering zone, also referred to as plasticizing and melting zone, and zone B, the mixing zone. These zones may be separated by a section F which is optional, a sealing restriction in the form of a so-called "blister" 19; this provides a resistance zone of further reduced channel depth, which assists in preventing backflow into zone A. The blister is not flighted.

In zone A, one or more heat exchange means (not shown) are provided, such as heating bands or heat exchange jackets surrounding the cylinder barrel. The screw in zone A is divided into three sections, designated, respectively, feed section C, pumping, compression, or transition section D, and metering section E. In all of zone A, the screw is provided with a helicoidal flight 18.

Feed section C of the screw has a relatively small root diameter, and consequently a large channel depth. The screw root diameter increases in transition section D, and is constant and relatively large in metering section E. The illustrated screw arrangement of zone A is well known in screw extruders for plastics.

In mixing and cooling zone B at least two separate heat exchange means are preferably provided, such as heat exchange jackets surrounding the cylinder barrel, to permit maintaining the plastic mass in the first part thereof at a relatively high temperature and to cool it in the last part to a desired substantially lower value.

At the beginning of mixing zone B, means are provided for injecting liquid foaming agent into the plastic mass. The mixing section of the torpedo is designed for providing mixing of the two fluids, as will be described in greater detail hereafter. Briefly, at least the first part of the torpedo, preferably at least as much as lies in the heated part of the mixing zone, is provided with mixing elements which consist of alternating grooved cylindrical disks or collars 21 and short annular flow sections 22. In the last part of zone B heat exchange means suitable for cooling are provided. These may consist of a single jacket surrounding the barrel, or may be several separately controllable heat exchange means along the barrel, to permit control of the rate of cooling. Means are also provided for heating the last part, if required, during startup of the process. The section of the torpedo which lies in the cooled part of zone B may have the same arrangement of mixing elements and flow sections as the section in the part; alternatively, it may contain longer mixing elements 23. These may be conventional so-called Dulmage stages, or may be similar in design to mixing elements 21 except for greater length. The purpose of the mixing elements in the cooled part of zone B is mainly to provide intimate heat exchange between the mass and the barrel wall.

A conventional screen pack may be placed between the extruder barrel and the die. This is not shown in the drawing.

In the production of expanded sheet or rod, conventional dies may be utilized, as illustrated by die 13. In the production of blown film, according to this invention, a conventional pipe die or blown film die may be utilized, which has an annular orifice and is provided with an air passage arranged in the mandrel of the die to permit a desired air pressure to be maintained within the extruded tube.

The means for cooling the extrudates and the takeup apparatus, may be of conventional type, and are not illustrated.

For the practice of the process of this invention the extruder illustrated in the drawing may be modified, provided the limitations which are essential to successful practice of this invention are observed.

In the operation of the process of this invention as illustrated in FIG. 1 of the drawing, an intimate mixture of polymer particles and a suitable thermally decomposing blowing agent is introduced into the extruder through feed hopper 14.

As a result of the rotaton of screw 18, the mixture is continuously conveyed through the extruder barrel in the direction of the die. In the part of plasticizing or melting zone A which coincides with section C, the mixture is melted by means of heat supplied through the barrel wall from external heating means together with frictional heat developed in the mixture. The major compression of the mixture is accomplished in compression or transition section D of zone A. Steady, metered flow of the plastified mixture is secured in metering section E of zone A, in which both screw root diameter and pitch of the screw flight are constant. The plastified mass is moved through the narrow channel between blister 19 and the barrel wall and enters the mixing zone. Liquid foaming agent is injected into the plastified mixture at the beginning of the mixing zone.

The force which moves the plastified mass through the mixing and cooling zone and through the die is the pressure drop between the metering zone, or the sealing restriction when present, and the die. The extremely uniform mixture of plastic and blowing agent which is essential for successful production of foamed polyolefin extrudates is provided in a relatively short mixing section by a special arrangement of mixing elements, as illustrated in the drawing.

The beginning of the mixing zone is here defined as the first point at which volatile foaming agent is injected into the extruder. This injection may be effected through one or more supply openings communicating with inlet line 15. As illustrated in FIG. 1, the liquid injection orifice is arranged to inject the liquid into an annular flow section which is preceded by a single mixing element. Alternative arrangements are possible, for example, as by placing the injection orifice opposite a groove in a mixing element, as illustrated in FIG. 4.

When several supply openings at the beginning of the mixing zone are used, they may be advantageously arranged in a symmetrical manner around the circumference of the barrel. It is also possible to employ several supply openings positioned at varying points in the longitudinal direction of the mixing zone. This leads to a gradual increase, at each injection point, in the foaming agent content of the mass flowing into the extruder. The injection may be affected axially, radially or tangentially. The injection of the volatile foaming agent may require no more than small excess pressures, for example, of a few atmospheres.

Since the liquid foaming agent is injected into the plastic mass substantially continuously it is important to provide for continuously sweeping it away from the injection orifice and for uniform distribution of small portions of the liquid foaming agent in portions of the flowing plastc mass. If relatively large portions of foaming agent were permitted to aggregate in the extruder it would become impossible to achieve the uniform dispersion which is essential to production of foamed film of uniform quality. It has been found that the necessary mixing action for achieving the desired uniform dispersion is best obtained in a mixing zone of modest length in which the torpedo contains a number of grooved mixing elements 21, separated from each other by annular flow sections 22. The torpedo in at least the first part of the mixing zone preferably contains such alternating mixing elements and annular flow sections.

A typical mixing element is illustrated in section in FIG. 2 and isometrically in FIG. 3. It consists of a cylindrical disk having an external diameter which is smaller than the bore of the extruder barrel diameter by only enough to provide for clearance without permitting substantial axial flow of plastic except through the grooves of the mixing element. The clearance is suitably between 0.05 and 0.25 mm.; it is typically 0.1 mm. The length of each mixing element is in the range from 0.03D to 0.8D, but is preferably about 0.1 to 0.2D. The grooves of the mixing element may have any desired shape, e.g., they may be sections of a circle, parabola, rectangle or square. The ratio of the width of the lands 25 between grooves 24 to the width of the arcs subtended by the grooves at the circumference of the disk, in section, is suitably in the range from 0.01:1 to 1:1, and preferably between about 0.1:1 and 0.4:1. The grooves of the mixing elements may be aligned with the axis of the torpedo, or they may be angled as much as 60° with respect to the axis of the torpedo. The direction of rotation of the grooves is preferably the same as the direction of rotation of the threads in the plasticizing zone.

FIG. 3, illustrating isometrically a typical mixing element of this invention 21, shows the appearance of grooves 24 and the lands 25 between the grooves. Unlike the grooves of Dulmage mixing elements, the grooves as shown are of constant width; the crowns of the mixing elements are not tapered, but are of constant diameter. The number of grooves can vary. It is defined by the above-stated ratios between width of lands and grooves.

The annular flow sections which alternate with the mixing elements suitably have the same channel depth as the grooves of the mixing elements. Their length is suitably between 0.03 and 0.3D and preferably is about 0.1D. Generally the length of annular sections between mixing elements is from 0.5 to 2 times that of the adjoining elements.

The barrel of the extruder is provided with means (not shown in the drawing) enabling the mass inside the barrel to be heated or cooled. In the plasticizing or melting zone A the temperature of the mass is raised by conduction and frictional heat in such a way that the temperature in the last portion of the said zone is in general 100°–300° C. Also, in the first part of the mixing zone B the mass temperature may suitably be maintained at a high value. In the remaining portion of zone B the temperature of the mass during its conveyance in the direction of the die, may be lowered, e.g., by cooling the mass with ever increasing intensity so that the temperature of the mixture issuing from the die is usually between 100° and 160° C. The said temperature limits are different for the various polymers. Thus, in the extrusion of polypropylene, a maximum mass temperature lying between 180° and 280° C.

is in general suitable. In this case, the preferred range is between 200° and 240° C. The preferred limits for the temperature of the mixture issuing from the die, the extrudate temperature, are then 140° and 170° C. In the case of polyethylene the maximum mass temperature lies in general between 100° and 260° C., preferably between 160° and 200° C., the extrudate temperature being preferably from 105° to 120° C. In the case of polyvinyl chloride suitable maximum mass temperatures may vary from 140° to 220° C., preferably from 160° to 200° C., while for the extrudate temperature the limits 135° and 155° C. may be maintained as preferred limits.

Two major considerations enter into the arrangement and operation of heat exchange means in zone B. The first part of zone B, which is adapted to provide heating or mild cooling of the plastic should be long enough that a substantially homogeneous mixture of liquid foaming agent in the plastic is formed therein. For this reason, the length of this part is affected by the efficiency of the mixing action of the torpedo. The part of zone B in which substantial cooling of the plastic mass occurs, must be long enough that the mixture can be cooled therein to a desired relatively low exit temperature. Its length, therefore, is a function of the efficiency of the cooling means; this is affected, for example, by temperature of cooling fluid, configuration and heat transfer characteristics of the heat exchange surfaces, heat transfer properties of the plastic mass, and the like.

The polymer which in the process of the invention are worked up to form a foam may contain the conventional additives such as thermo-stabilizers, anti-oxidants, light stabilizers, pigments, fillers, antistatic agents, lubricants or plasticizers, flame-extinguishing or flame-retarding agents and compounds which prevent the blocking of films. When, in the process of the invention, polyvinyl chloride is used as thermoplastic polymer, it may be either soft polyvinyl chloride, i.e., contain a large amount of plasticizer, for example, 35% by weight, or hard polyvinyl chloride. The latter usually contains not more than 10% by weight of plasticizer.

By using various extrusion orifices the foam may be obtained in the form of plates, sheets, films, tubes, rods, strands, bars, pipes and the like. The foam may also be applied as a coating on threads or cables. To this end the thread or cable is drawn through the die together with the extrudate, a cross head being advantageously used for this purpose.

The resultant foamed films or sheetings having a thickness of from 0.1 to 1 mm. are very flexible and possess good writing properties; they may, inter alia, be used as substitutes for types of paper, such as packing paper or wallpaper. Moreover, sheetings having a thickness of from 0.5 to 5 mm. may suitably be shaped with the aid of the known shaping techniques, such as vacuum forming, into shaped articles, such as bowls, beakers, plates or containers for various packing purposes. Films having a thickness of from 2 to 10 mm. may in particular be used as sound or thermal insulating materials. Polypropylene and polyethylene foams are particularly suitable for electrical insulating material.

The invention will now be further illustrated with reference to the following examples.

Example I (A) Use was made of an extruder of the type shown in the drawing, having a barrel internal diameter $D=60$ mm. and a length of 32D. The lengths of the supply zone C, compression zone D, metering zone E, blister F and mixing zone B were 14.5D, 1D, 5D, 1.5D and 10D, respectively. The compression ratio of the screw, i.e., the ratio of the channel depth in the transport zone and in the metering zone, was 3:1. The die of the extruder had an annular orifice with a diameter of 4 mm. The speed of the extruder in this experiment was 31 r.p.m.

The starting material used was an isotactic polypropylene having a melt index of 2–4. The thermally decomposing blowing agent used was azodicarbonamide which decomposes in the mixture in the extruder at approximately 180° C.; it was passed through the hopper into the extruder together with the polymer, in a quantity of 0.5% by weight, based on the polypropylene. The temperature of the mixture was increased by conduction and frictional heat to such as extent that it was 220° C. at the end of the metering zone, this being at the same time the maximum mass temperature prevailing in the extruder. At the beginning of the mixing zone 8% by weight of n-pentane, based on the polymer, was injected into the mass. In the mixing zone the temperature of the mass was gradually reduced, the temperature of the mass issuing from the die being 146° C. The pressure of the mass in the mixing zone was successively measured at the beginning of the mixing zone, i.e., at the injection opening, exactly half-way the mixing zone, and at the end thereof, i.e., at the entrance of the die. These pressures were 335 atm., 290 atm. and 210 atm., respectively.

The mass issuing from the orifice of the die immediately expanded into a bar-shaped foam having a diameter of 16 mm. and a homogeneous, closed cell structure, internally and on the surface. The cell size of the foam was 0.3 mm. and the density 2.5 lbs./cu. ft. This foam quality remained the same throughout this experiment, which was carried out continuously for 20 hours. The yield of the product was 11 kg./hr.

(B) The experiment was repeated under the same conditions, but in this case 2% by weight of finely divided CaO was added to the mixture. The cell size and the density of the foam did not become smaller.

The following experiments were carried out for purposes of comparison.

(C) Experiment A was repeated under the same conditions, except that no azodicarbonamide was taken up into the mixture. The resultant foam now had a coarse and irregular cell structure. Large burst gas blisters were observed on the surface. Beneath the surface the cell size varied from 0.5 to 2.5 mm., larger cavities also being present locally, and the density of the foam was approximately 3.1 lbs./cu. ft.

(D) Experiment A was repeated several times under the conditions described, with the exclusion of the volatile foaming agent. The concentrations of the azodicarbonamide used varied in this case from 0.5 to 5% by weight. The resultant foam had a very fine cell structure with cells which were smaller than 0.1 mm. When using 0.5% by weight of azodicarbonamide the density of the foam was 27 lbs./cu. ft., when using 2–5% by weight the lowest density which could be obtained was 21.9 lbs./cu. ft. while at 5% by weight many cells in the foam had burst.

(E) Experiment A was repeated under the same conditions, except that in this experiment azodiisobutyronitrile was used instead of azodicarbonamide. This thermally decomposing blowing agent had, under the conditions used in the mixture, a decomposition temperature of approximately 115° C. The concentrations of this material used in several experiments varied from 0.5 to 1.5% by weight. The foam properties found were the same as those of the experiment in which no chemically decomposable gas-liberating compound was used (Experiment C).

(F) Also in an experiment carried out using 0.5% by weight of silica instead of azodicarbonamide and, for the rest, under the same conditions as those mentioned under experiment A, the results described under experiment C were achieved. When the concentration was raised to 5% by weight, the resultant foam had a structure corresponding to that of the product obtained when using 5% by weight of azodicarbonamide, but without volatile foaming agent (see Experiment D).

(G) In this experiment use was made of an extruder which contained a compression zone in the mixing zone. The length of the transport zone C, compression zone D, metering zone E, blister F and the mixing zone B were 10.5D, 1D, 5D, 0.5D and 15D, respectively. The first part of the mixing zone was divided successively into 2.5D metering zone, 2D compression zone and 0.5D metering zone, while the last part, having a length of 10D, was identical to the mixing zone of the extruder described under A, i.e., its entire length was provided with mixing elements of the type shown in the drawing. The compression ratios of the screw part before and after the blister were both 3:1.

In this experiment the pressure of the mass in the mixing zone was measured at points which were situated at distances of 15D, 10D, 5D and 0D, respectively, from the end of the mixing zone, i.e., the entrance of the die.

Just as in experiment A, 0.5% by weight of azodicarbonamide was added to the polypropylene through the hopper and n-pentane through the injection opening. The temperature curve of the mixture in the extruder was equal to that mentioned under A.

In this experiment it was not possible to keep the quality of the foam constant. At the injection opening the pressure varied from 200 to 340 atm. in a running period of approximately 4 minutes. The pressure fluctuations in the mixture propagated in the mixture during its conveyance in the direction of the die, the fluctuations being only slightly dampened: the pressure variation at the measuring point at the end of the mixing zone was approximately from 230 to 310 atm. As a result of these pressure fluctuations it was not possible to inject 8% by weight of pentane continuously. The foam was obtained in an irregular yield, the variation in cell size in the foam, calculated over a production period of half an hour, varied with a factor 3, the lowest and highest densities observed differing with a factor 2.

EXAMPLE II (H) A foam was manufactured from polyethylene, using the same extruder as described under Example I(A). The polyethylene had a density of 0.925 and a melt index of 0.3. The speed of the extruder was 20 r.p.m. As volatile foaming agent 10% by weight of n-pentane was injected and a thermally decomposing blowing agent, 0.5% by weight of 4,4'-oxy-bis(benzenesulfohydrazide) was used, which decomposed in the mixture at approximately 125° C. The maximum mass temperature attained in the mixture immediately before the blister was in this experiment 175° C. The pressure of the mixture in the mixing zone was at the injection point 280 atm., half-way the mixing zone 210 atm. and at the entrance of the die 125 atm. During its conveyance to the die the mixture in the mixing zone was cooled until the temperature of the mixture issuing from the die was 113° C. This mixture immediately expanded to a foam, which was rapidly cooled by air-blowing.

During a production period of 20 hours the cell size invariably remained 1 mm. and the density 5.9 lbs./cu. ft. The cell size distribution in the foam was homogeneous.

The following experiments were carried out for purposes of comparison.

(I) Experiment H was repeated under the same conditions, the thermally decomposing blowing agent being, however, omitted. The resultant foam had large cells with dimensions of from 5 to 10 mm. The cell size distribution was in this case very irregular and large burst gas blisters occurred on the surface. The average density of the foam was approximately 10 lbs./cu. ft.

(J) Experiment H was repeated using 0.5% by weight of benzenesulfohydrazide, the conditions being otherwise the same. This blowing agent decomposed in the mixture at approximately 100° C. The properties of the foam produced were substantially the same as those in a foam produced without thermally decomposable gas-liberating compound (Experiment I). The cell size distribution was very irregular and many cells had a diameter of approximately 10 mm.

EXAMPLE III (K) The extruder used in this experiment had a length of 20D and a diameter $D=60$ mm.; this extruder was also of the type shown in the drawing. The transport zone C, compression zone D, metering zone E, blister F and mixing zone B were 5D, 1D, 3.5D, 0.5D and 10D respectively. The compression ratio of the screw was again 3:1, the die was provided with an annular orifice with a diameter of 4 mm. The maximum mass temperature employed was 175° C., this temperature being measured in the mass immediately before the blister. The temperature of the mixture during the expansion to foam was 141° C. Measurements of the pressure at the injection point, exactly half-way the mixing zone and at the entrance of the die produced constant values of 130, 100 and 70 atm., respectively.

Starting from a polyvinyl chloride composition containing 10 parts by weight of dioctylphthalate, 3 parts by weight of basic lead sulphate, 1 part by weight of Ca stearate and 2 parts by weight of glycerol monostearate per 100 parts by weight of polymer, and using 0.5% by weight, based on the composition, of diphenylsulfone-3,3'-disulfohydrazide as thermally decomposing blowing agent (decomposition temperature in the mixture approximately 125° C.), a bar-shaped foam with a diameter of 15 mm., a density of 3.8 lbs./cu. ft and a homogeneous cell size of 0.3 mm., was produced by extrusion under injection of a mixture consisting of 50 vol. percent of acetone and 50 vol. percent of n-pentane in a quantity of 7½% by weight, likewise based on the said composition. The color of the product was a clear white. The yield at a speed of 18 r.p.m. was 12 kg./hr. The experiment was continued for 15 hours without interruption, no change in the foam-quality being observed during this period.

The following experiments are given for purposes of comparison.

(L) The extruder and conditions employed were the same as those used in experiment K, the thermally decomposing blowing agent being, however, omitted. The product obtained could scarcely be called a foam. The cell walls burst during expansion and after cooling a shriveled material remained.

(M) Experiment K was repeated under the same conditions. This time the injection of the volatile foaming agent was, however, omitted. The shaped product had small, homogeneous cells and the density was 46.8 lbs./cu. ft.

Higher concentrations of thermally decomposing blowing agent of up to 10% by weight produced densities of not lower than 16.8 lbs./cu. ft. Use of still higher concentrations proved to be scarcely possible because a well-homogenized mixture could not be obtained in the extruder.

(N) Serious difficulties were also encountered using an extruder, the mixing zone of which was provided with a compression zone. In this extruder the screw part up to and including the blister was identical to the extruder described above under Example I(G). The first part of the mixing zone successively contained a compression zone having a length of 3D with a compression ratio of 3:1, and a metering zone of 2D. The last part of the mixing zone was entirely provided with mixing elements, the length of this part was 10D.

The conditions employed in this experiment were, for the rest, the same as those in experiment K, except for the pressures measured in the mixing zone, which fluctuated very strongly so that a continuous injection of 7.5% by weight of volatile foaming agent was not possible. The quality of the foam produced varied with the time, exactly as described above under Experiment I(G).

No definite reason can be assigned for the criticality in selecting a thermally decomposable gas liberating compound which decomposes within 60° C. of the maximum mass temperature in the extruder. However, Examples I(E) and II(J) demonstrate that use of compounds which decompose below this range gave no significant nucleating effect. Similarly, it has been found that foam nucleating systems which rely on a chemical reaction and which are highly satisfactory in nucleating extruder-gassed polystyrene foams give erratic and non-reproducible results with polyolefins under extrusion conditions such as described in the examples. It is thought that this is due to the fact that such systems liberate gas over a range of temperatures including those below the critical range, rather than at some one temperature which is well-defined for a given system.

The preferred polymers for use in this invention are resins consisting predominantly of crystallizable stereoregular and particularly of isotactic polypropylene. Following conventional terminology, reference to "crystallizable" or "stereoregular" polypropylene means, unless the context indicates otherwise, solid polypropylene having a high degree of stereoregularity reflected in at least 50% crystallinity, usually between 60 and 70% (as determined by X-ray diffraction analysis, infrared analysis or comparable methods), when solidified under conditions which favor crystallization. In general, this type of polypropylene contains at most only a very small proportion which is extractable in paraffinic hydrocarbons up to gasoline boiling range. Typically, the proportion of highly crystallizable polypropylene which is extractable in boiling heptane or octane is less than 10% and usually less than 5%. The viscosity average molecular weight of such stereoregular polypropylene is usually at least about 40,000 and generally between 100,000 and 1,600,000. The intrinsic viscosity, measured in Decalin at 150° C., expressed in dl./g., may be as low as 0.8 or less and as high as 12 or more. Crystallizable polypropylene employed in the production of foamed articles according to this invention suitably has an intrinsic viscosity between 1 and 12 and preferably between 1.5 and 7.

The crystal melting temperature ($T_m$) of highly isotactic polypropylene is 167° C. At temperatures below 167° C., polypropylene crystals can form. The rate at which they form and the rate at which the polymer solidifies is a function of the cooling conditions. It is known that isotactic polypropylene does not achieve its normal crystalline state until it has been cooled below a recrystallization temperature ($T_c$) which generally lies between 120° and 145° C. and is a function of the rate of cooling.

Foamed articles can also be prepared according to this invention from crystalline linear polymers of other alpha-mono-olefins particularly of those having from 2 to 8 carbon atoms, such as ethylene, 1-butene, 3-methyl-1-butene, 4-methyl-1-pentene, 4-methyl-1-hexene and the like, which are known to produce crystalline polymers. All of these polymers are produced by so-called low pressure polymerization methods. Reactant, catalysts and conditions useful in the production of such polyolefins are known. The state of the art in this field in 1959 was reviewed for example in "Linear and Stereoregular Addition Polymers" by Gaylord and Mark, Interscience Publishing, New York, 1959. Polyethylene and polypropylene resins are now staple materials of commerce and polymers of other olefins can be similarly prepared.

Non-rubbery copolymers of the above-mentioned olefins, such as block copolymers, are also suitable for use in this invention.

We claim as our invention:

1. In a process for the manufacture of shaped cellular extruded articles from a composition of thermoplastic synthetic organic polymer selected from the group consisting of polyolefins and polyvinylchloride, which composition is free of filterable solids, by extrusion through a die of a mixture prepared by admixing said polymer and from 2 to 20% by weight of a volatile organic foaming agent in a single-screw extruder, which mixture on leaving the die expands to a foam, the improvement which comprises incorporating in said mixture from 0.01 to 1.0 percent by weight, based on polymer, of a thermally decomposing organic blowing agent which decomposes therein without leaving a solid, filterable residue at a temperature which is not more than 60° C. lower than the maximum mass temperature prevailing in the extruder, and intensively homogenizing said mixture in a mixing zone of the extruder after the volatile foaming agent has been injected into said zone, while it is being conveyed in the direction of the die, the pressure of the mass at the point at which volatile blowing agent is injected being greater than at any point downstream therefrom.

2. A process according to claim 1 wherein the concentration of said thermally decomposing blowing agent is between 0.1 and 1% by weight and the concentration of said volatile foaming agent is between 5 and 10% by weight, based on the polymer, and said thermally decomposing blowing agent decomposes in the mixture at a temperature which is not more than 40° C. lower than the maximum mass temperature prevailing in the extruder.

3. In a process for the manufacture of shaped cellular extruded articles from an isotactic polypropylene composition which is free of filterable solids, by extrusion through a die of a mixture prepared by admixing said composition and from 2 to 20% by weight of a volatile organic foaming agent in a single-screw extruder, which mixture on leaving the die expands to a foam, the improvement which comprises incorporating in said mixture from 0.01 to 1.0 percent by weight, based on polymer, of a thermally decomposing organic blowing agent which decomposes therein without leaving a solid, filterable residue at a temperature which is not more than 60° C. lower than the maximum mass temperature prevailing in the extruder, said maximum mass temperature being in the range from 200 to 240° C., and intensively homogenizing said mixture in a mixing zone of the extruder after the volatile foaming agent has been injected into said zone, while it is being conveyed in the direction of the die, the pressure of the mass at the point at which volatile blowing agent is injected being greater than at any point downstream therefrom.

4. A process according to claim 3 wherein said thermally decomposing blowing agent is azodicarbonamide, present in a concentration in the range from 0.1 to 1% by weight, and said volatile foaming agent is a paraffin hydrocarbon of from 4 to 5 carbon atoms per molecule, present in a concentration from 5 to 10% by weight, based on the polymer.

5. In a process for the manufacture of shaped cellular extruded articles from a polyethylene composition which is free of filterable solids by extrusion through a die of a mixture prepared by admixing said composition and from 2 to 20% by weight of a volatile organic foaming agent in a single-screw extruder, which mixture on leaving the die expands to a foam, the improvement which comprises incorporating in said mixture from 0.01 to 1.0 percent by weight, based on polymer, of a thermally decomposing organic blowing agent which decomposes therein without leaving a solid, filterable residue at a temperature which is not more than 60° C. lower than the maximum mass temperature prevailing in the extruder, said maximum mass temperature being in the range from 160° to 200° C., and intensively homogenizing said mixture in a mixing zone of the extruder after the volatile foaming agent has been injected into said zone, while it is being conveyed in the direction of the die, the pressure of the mass at the point at which volatile blowing agent is injected being greater than at any point downstream therefrom.

6. A process according to claim 5 wherein said thermally decomposing blowing agent is 4,4'-oxybis(benzenesulfohydrazide), present in a concentration in the range from 0.1 to 1% by weight, and said volatile foaming agent is a paraffin hydrocarbon of from 4 to 5 carbon atoms per molecule, present in a concentration from 5 to 10% by weight, based on the polymer.

7. In a process for the manufacture of shaped cellular extruded articles from a polyvinylchloride composition which is free of filterable solids by extrusion through a die of a mixture prepared by admixing said composition and from 2 to 20% by weight of a volatile organic foaming agent in a single-screw extruder, which mixture on leaving the die expands to a foam, the improvement which comprises incorporating in said mixture from 0.01 to 1.0 percent by weight, based on polymer, of a thermally decomposing organic blowing agent which decomposes therein without leaving a solid, filterable residue at a temperature which is not more than 60° C. lower than the maximum mass temperature prevailing in the extruder, said maximum mass temperature being in the range from 160° to 200° C., and intensively homogenizing said mixture in a mixing zone of the extruder after the volatile foaming agent has been injected into said zone, while it is being conveyed in the direction of the die, the pressure of the mass at the point at which volatile blowing agent is injected being greater than at any point downstream therefrom.

8. A process according to claim 7, wherein said thermally decomposing blowing agent is diphenylsulfone-3,3'-disulfohydrazide present in a concentration in the range from 0.1 to 1% by weight, and said volatile foaming agent is a mixture of approximately equal parts of acetone and n-pentane, present in a concentration in the range from 5 to 10 percent by weight, based on the polymer.

References Cited
UNITED STATES PATENTS 3,200,176   8/1965   Baxter _____ 264—54
3,344,215   9/1967   Witz et al. _____ 264—53

PHILIP E. ANDERSON, *Primary Examiner.*

U.S. Cl. X.R.

260—2.5; 264—54, 176